Oct. 14, 1958  E. W. POTTMEYER  2,856,084
GRANULAR MATERIAL HANDLING EQUIPMENT
Filed May 1, 1951  8 Sheets-Sheet 1
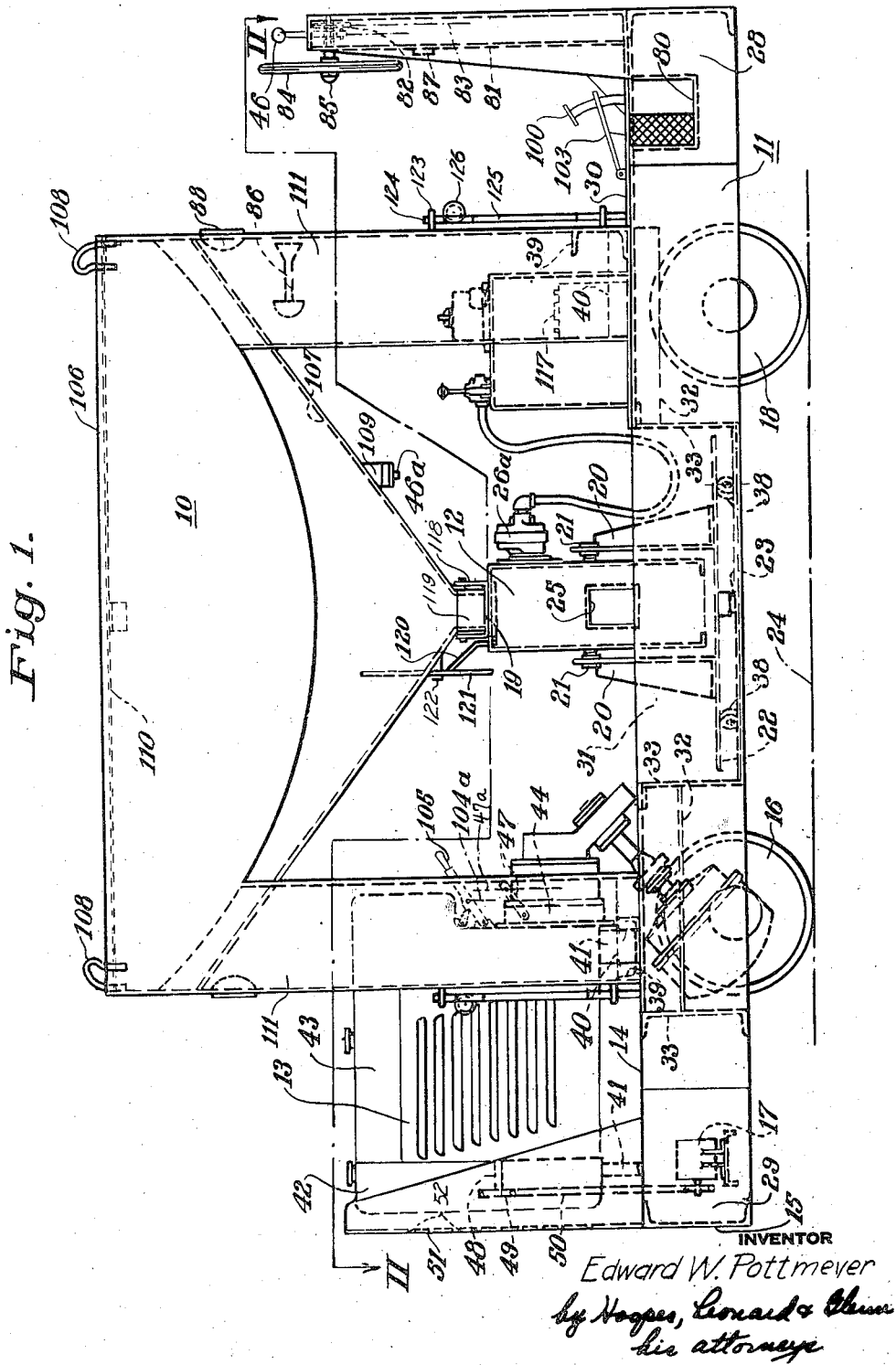
INVENTOR
Edward W. Pottmeyer
by Hooper, Leonard & Olsen
his attorneys

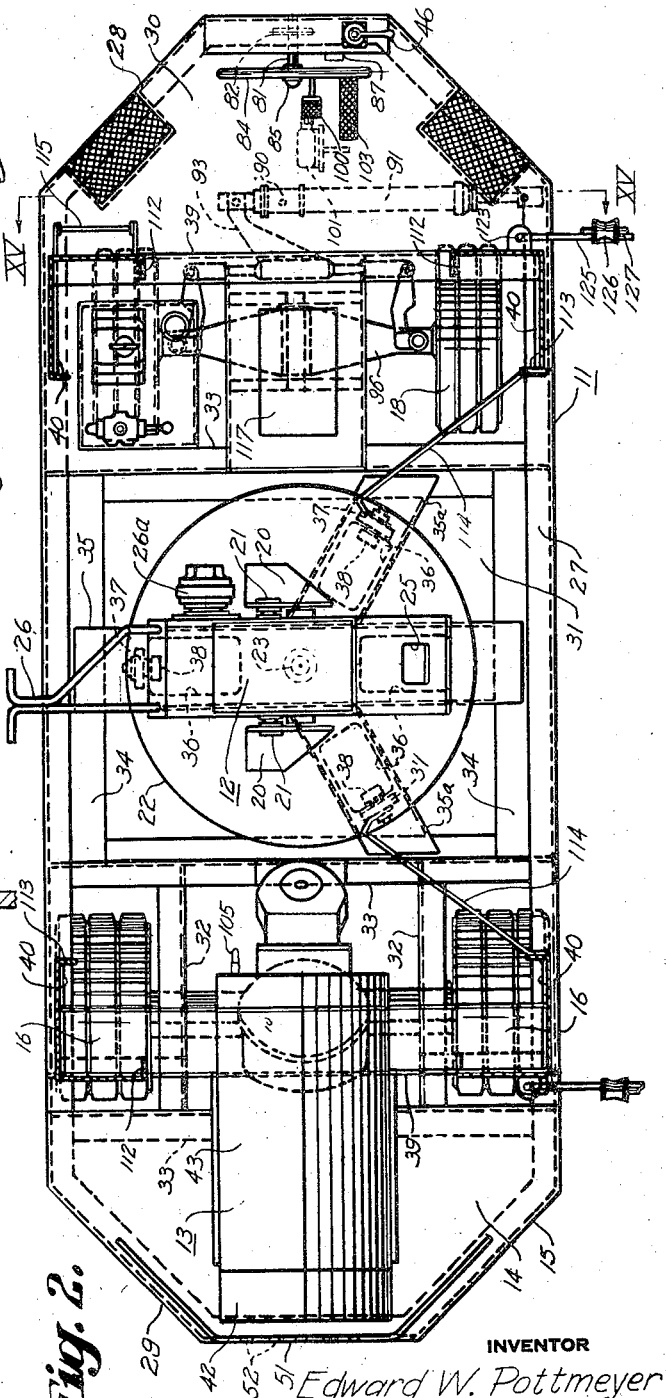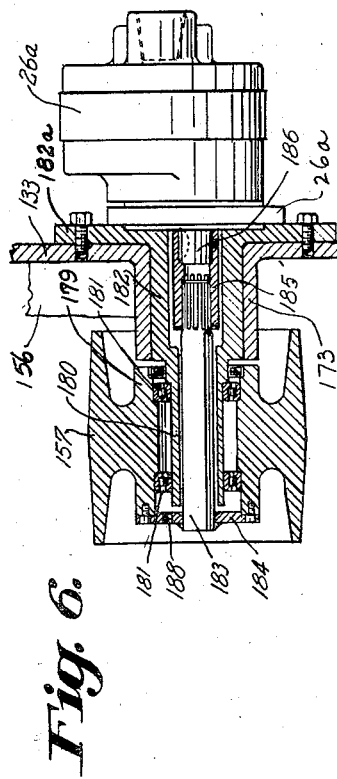

Oct. 14, 1958  E. W. POTTMEYER  2,856,084
GRANULAR MATERIAL HANDLING EQUIPMENT
Filed May 1, 1951  8 Sheets-Sheet 3
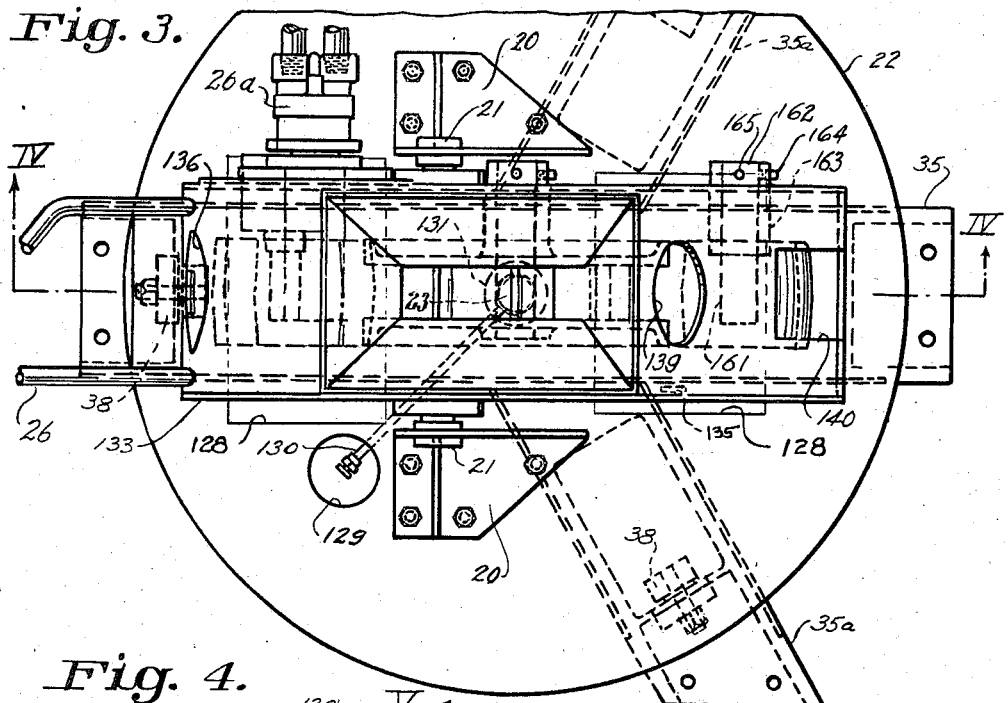
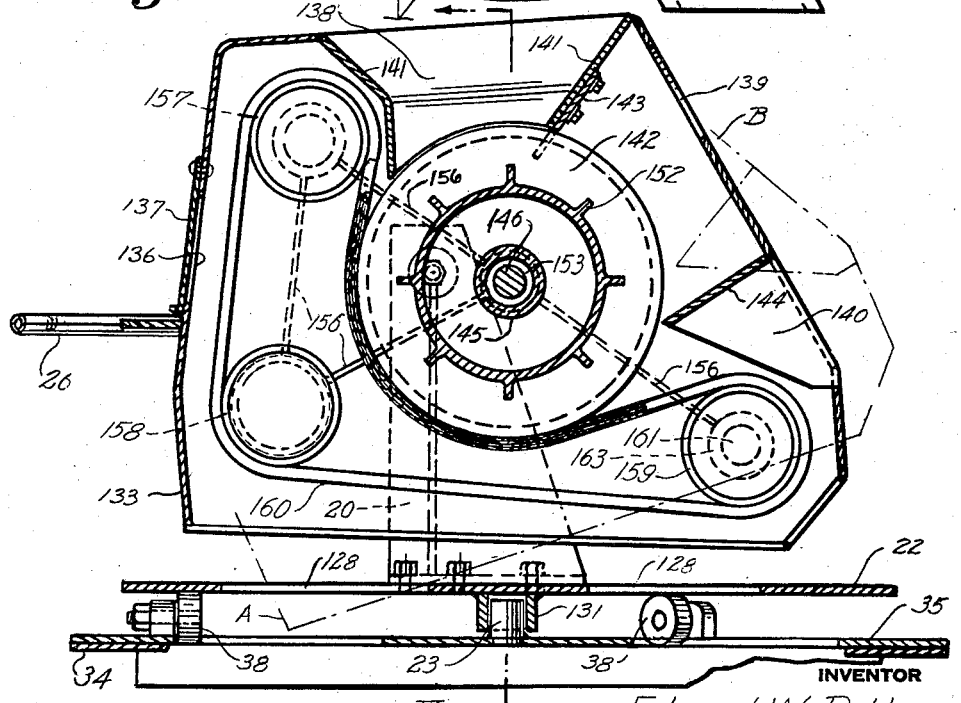
INVENTOR
Edward W. Pottmeyer
by Hooper, Leonard & Glenn
his attorneys Oct. 14, 1958  E. W. POTTMEYER  2,856,084
GRANULAR MATERIAL HANDLING EQUIPMENT
Filed May 1, 1951  8 Sheets-Sheet 4
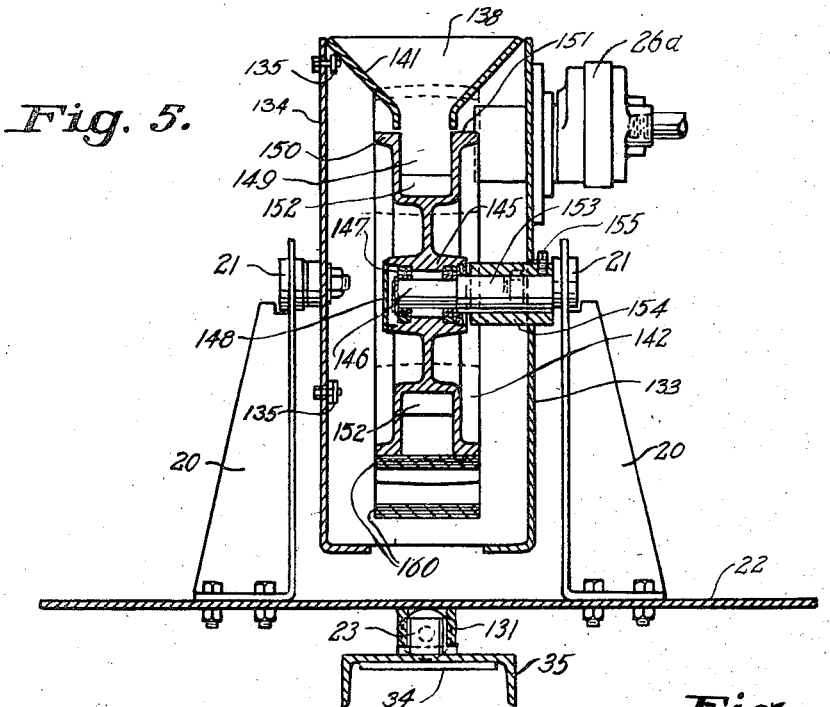
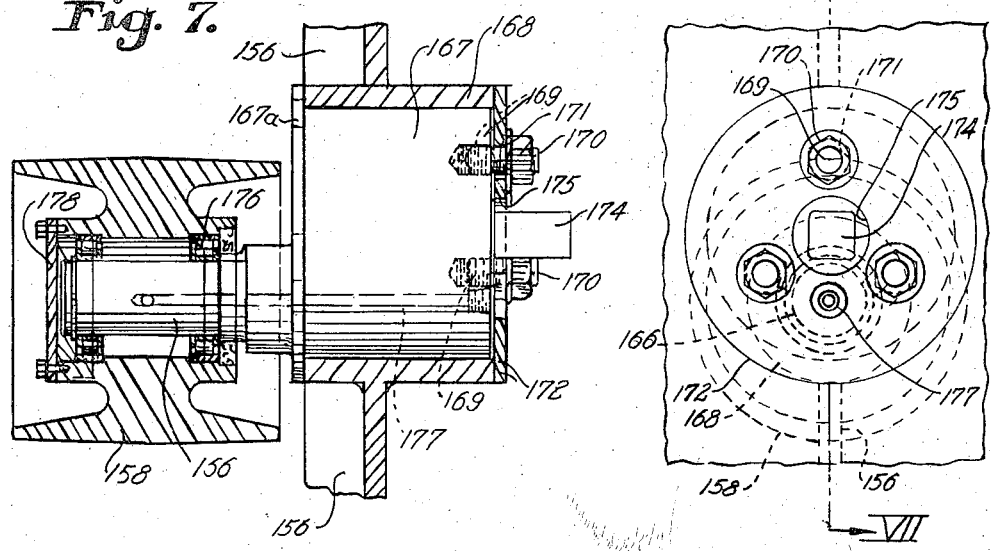
INVENTOR
Edward W. Pottmeyer
by Hooper, Leonard & Shem
his attorneys Oct. 14, 1958  E. W. POTTMEYER  2,856,084
GRANULAR MATERIAL HANDLING EQUIPMENT
Filed May 1, 1951  8 Sheets-Sheet 5

INVENTOR
Edward W. Pottmeyer
by Hoopes, Leonard & Glenn
his attorneys

Oct. 14, 1958  E. W. POTTMEYER  2,856,084
GRANULAR MATERIAL HANDLING EQUIPMENT
Filed May 1, 1951  8 Sheets-Sheet 6
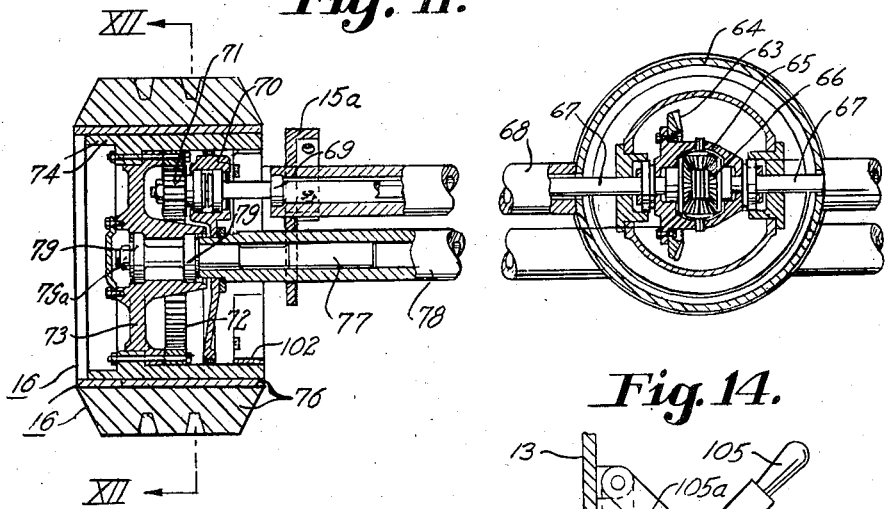
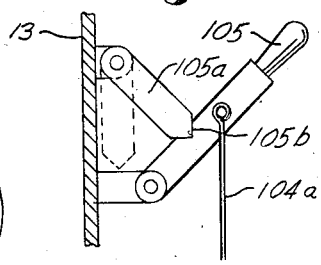
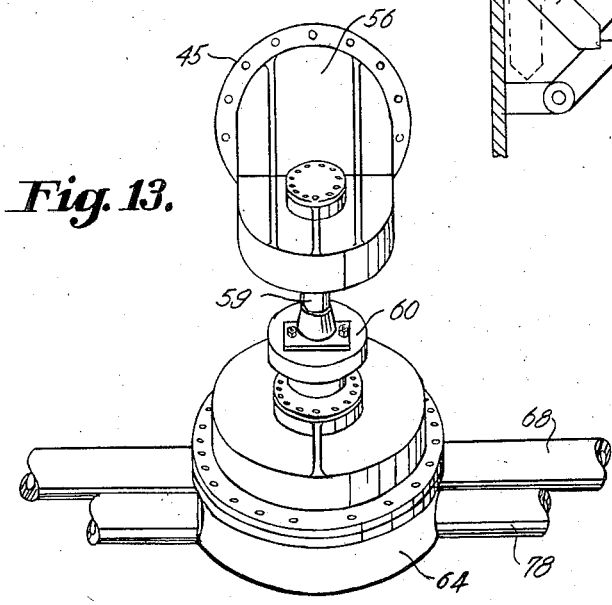
INVENTOR
Edward W. Pottmeyer
by Hooper, Leonard & Glenn
his attorneys.

Oct. 14, 1958 E. W. POTTMEYER 2,856,084
GRANULAR MATERIAL HANDLING EQUIPMENT
Filed May 1, 1951

INVENTOR
Edward W. Pottmeyer
by Hoopes, Leonard & Glenn
his attorneys.

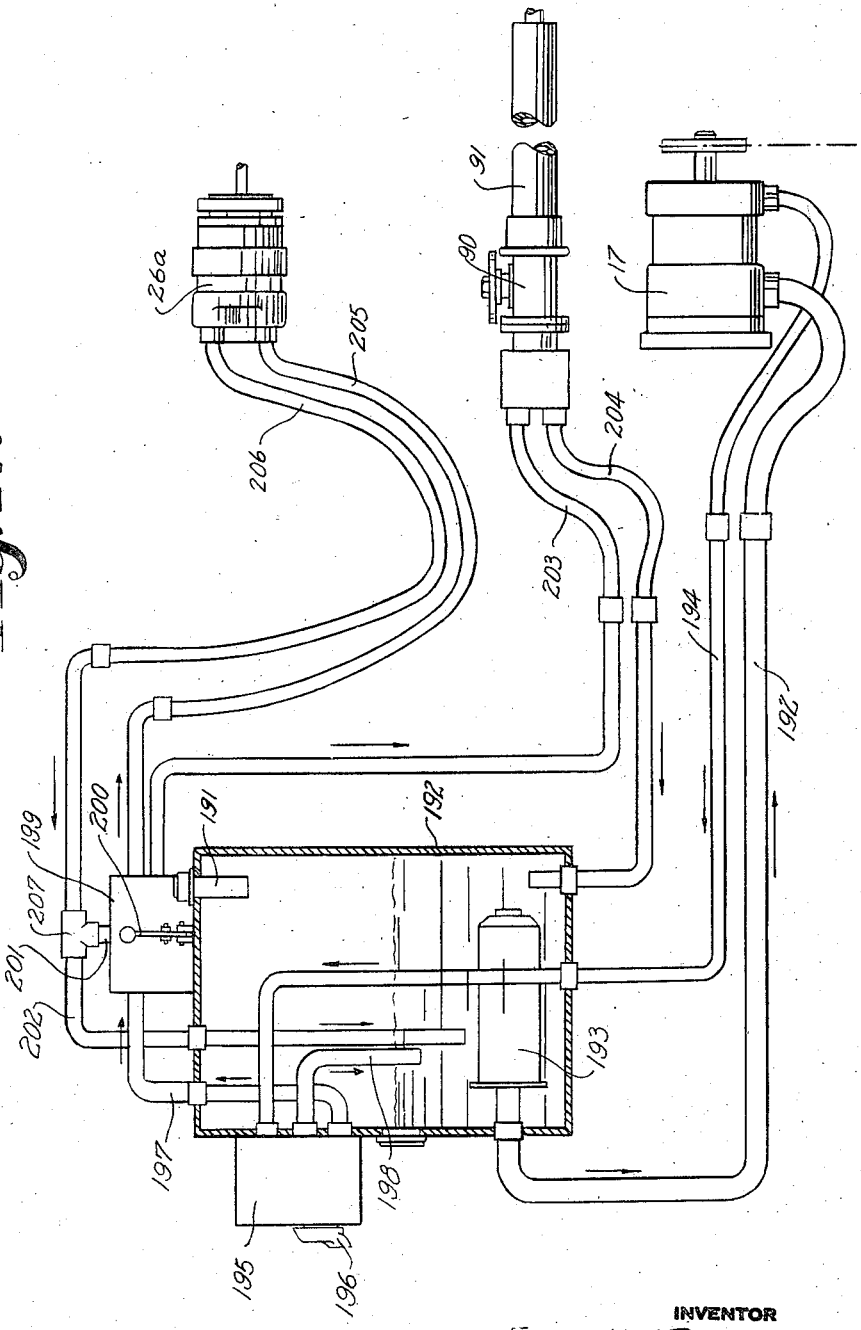

United States Patent Office 2,856,084
Patented Oct. 14, 1958

2,856,084

GRANULAR MATERIAL HANDLING EQUIPMENT

Edward W. Pottmeyer, Pittsburgh, Pa., assignor to Blaw-Knox Company, Pittsburgh, Pa., a corporation of Delaware Application May 1, 1951, Serial No. 223,944

9 Claims. (Cl. 214—18)

This invention relates to a movable granular material handling equipment for throwing such material in a selected direction a required distance at a desired trajectory. More particularly, this invention relates to a new so-called "dolomite" machine for steel making furnaces or the like, and especially to those in which mobility and self-propulsion are advantageous. This invention, still further, relates principally to novel throwing and truck assemblies utilized in such machines.

Heretofore, dolomite machines have been used chiefly for replacing the dolomitic lining in open-hearth basic steel furnaces. In one construction, a shop crane on the charging side of the furnaces was used to transport the machine from place to place in front of whichever charging door of the furnace was to be opened in order that material might be thrown therein against the furnace wall, for example, to make up the lining soon after the last heat had been tapped. In another prevalent form of such machine the bin for the granular material, such as dolomite, was mounted on a truck supported on flanged wheels. Such machines ran on the charging buggy rails. In order to move a machine from furnace to furnace it was usual to employ the hot metal crane on the charging side of the furnaces for that purpose. Whenever a machine had to be removed from the path of the cars carrying the charging boxes for the furnace, additional scheduling and movement difficulties ensued. These difficulties were heightened by the fact that furnaces cannot be tapped in any regular order and a machine might have to be moved to any furnace in the line as a make-up lining therein became necessary. The situation was even more difficult whenever the crane had to be employed to move the machine or the bin thereof, the time for which was taken from the crane's other duties. Even in the case of machines having propulsion means, the use of the crane, for example, might be required to move the machine over obstacles or out of the way, or to another furnace.

In the throwing assembly of such prior machines there was an imbalance. Such an imbalance was created frequently, for example, by the offset mounting of a driving motor for the throwing assembly. In the case of throwing machines operated while hanging from a crane, the lack of balance presented a number of difficulties. Moreover, it happens that the floors of mills in front of such furnaces are frequently uneven. Hence an operator in throwing granular material under such conditions to make up a lining of a furnace not only had to work the throwing assembly for that purpose but also had to make due allowance for any tendency of the throwing assembly to swing more or less freely. Such prior throwing assemblies, further, relied for the vertical inclination or elevation of the granular material upon the movement of a pulley wheel adjacent the discharge zone. As a consequence, it not only became difficult to provide pulley shafts in actual alignment but it was also difficult to maintain the flexible belt used therein in a true running condition relative to the pulleys and proper belt tension. The control of the electric motor usually used to drive the throwing assembly also involved a problem not only from the standpoint of the variable speeds that might be desired but also from the standpoint of an operator being within reach of such control at all times.

In the new machine and equipment of this invention the foregoing difficulties have been overcome. For example, not only may the new machine be self-propelled in a markedly advantageous mode but it may also be provided with driving and steering wheels of a character which not only will remain on the mill floor and carry the load involved but which also enables the machine to be moved to any charging door on any furnace, around any obstacle, or between shops without having to schedule any crane or trackways in time therefor. In addition, crane time formerly taken up with loading granular material into the new machine may be eliminated and the machine may go where the crane cannot reach. In the case of the electrical furnaces which frequently are circular, the new machine is able to operate in connection therewith just as readily as in the case of the usual open-hearth furnaces set in a straight line battery within a mill. Further, in constructing the new granular material handling equipment of this invention a novel throwing assembly is nested in a truck frame having a generally open center therefor over which a bin fits. The new throwing assembly is a unitary apparatus universally mounted generally along its axes, horizontal and vertical, relatively closely adjacent its center of gravity. Thereby any tendency for the throwing assembly to become imbalanced is minimized. In the new throwing assembly the shafts of the pulleys are aligned readily and all the pulleys are moved bodily in the operation thereof. Hence, no belt tension problems or true running difficulties are encountered. An hydraulic system is provided both for purpose of steering the new mobile machine and to drive a motor for operating the throwing assembly belt at a selected speed whereby the balance and accurately and locally controlled speed of that assembly may be kept and obtained respectively. Further, a materially more compact and lighter device for the same granular material capacity is provided. Although the new machine may be termed a dolomite machine, other granular materials may be thrown thereby in the selected direction for the selected distance. For example, such another granular material might be the "chrome ore" used in making up the lining of electric furnaces for stainless steel, or sand, used in acid open-hearth operations.

Other objects and advantages will be apparent from the following description and the drawings, which are illustrative only, in which:

Figure 1 is a view in side elevation looking at the furnace side, with the heat guards removed, of a new machine constituting an embodiment of this invention;

Figure 2 is a view in plan of the new machine shown in Figure 1 taken along line II—II of Figure 1;

Figure 3 is a plan view on a somewhat enlarged scale of the novel throwing assembly shown in Figures 1 and 2;

Figure 4 is a view in section and in elevation taken along line IV—IV of Figure 3;

Figure 5 is a view in section and in elevation taken along line V—V of Figure 4;

Figure 6 is a view on a somewhat enlarged scale partly in section on the axis of the drive pulley assembly of the new throwing assembly illustrated more particularly in Figures 3 to 5, inclusive;

Figure 7 is a view on a somewhat enlarged scale of the take-up pulley, in section along the axis thereof, which pulley is in the new throwing assembly more fully illustrated in Figures 3 to 5, inclusive;

Figure 8 is a view in end elevation looking toward the outer end of the take-up pulley assembly illustrated in Figure 7;

Figure 9 is a detailed view in side elevation showing the gate used in the new machine illustrated in Figure 1;

Figure 11 is a view in section taken along line XI—XI of Figure 10;

Figure 13 is an end view principally of the housings of the mechanism connecting the prime mover and drive wheels;

Figure 14 is a more detailed view on a somewhat enlarged scale of an accelerator lever and latch mechanism used in conjunction with the prime mover illustrated in Figures 1 and 2;

Figure 10:
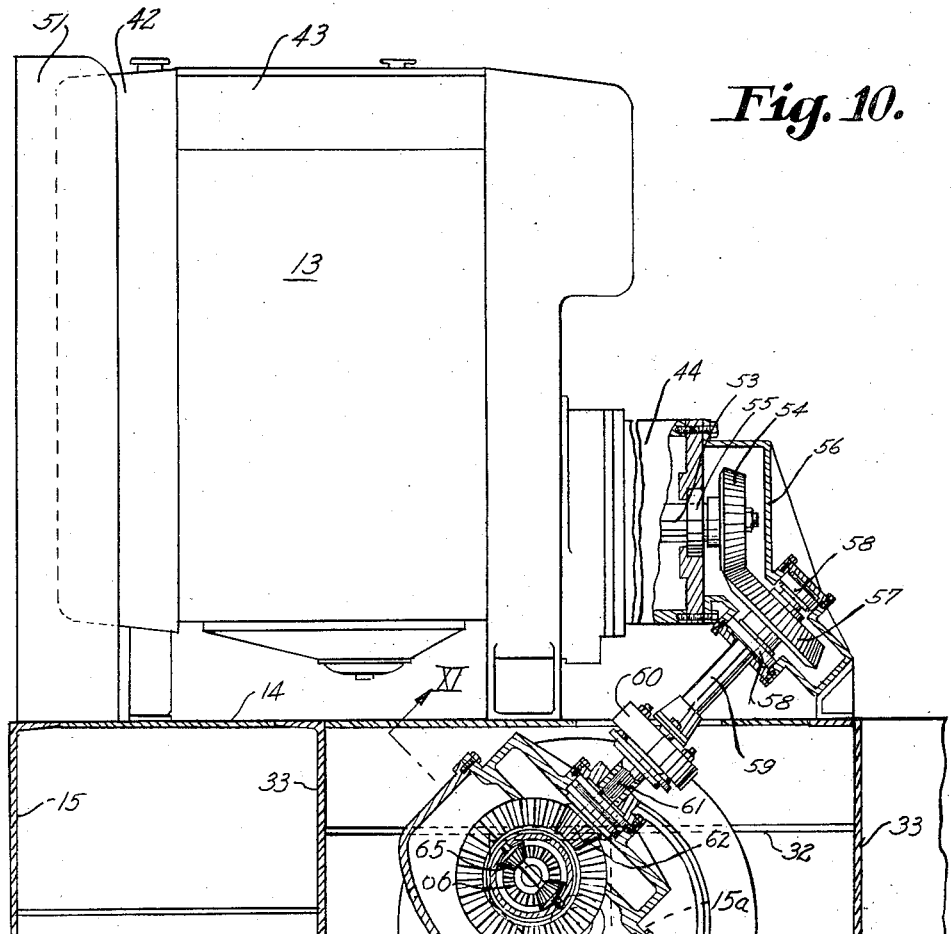
Figure 10 is a view in side elevation, and partly in section, of the prime mover and associated mechanism for turning the drive wheels of the new machine illustrated in Figure 1.
Figure 12:
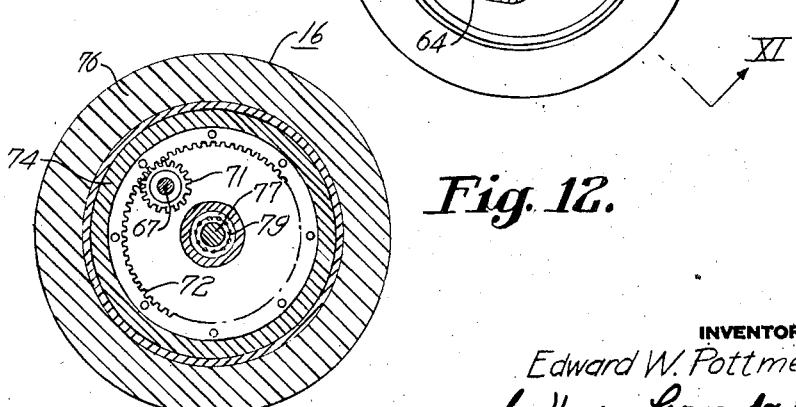
Figure 12 is a view in section taken along line XII—XII of Figure 11.
Figure 16:
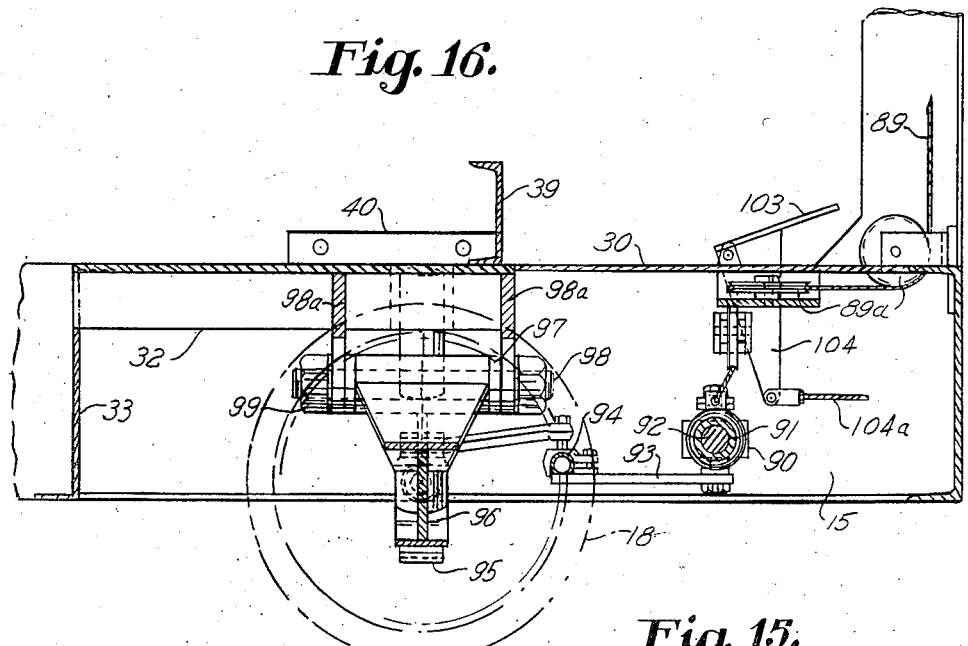
Figure 16 is a view in section of the mechanism shown in Figure 15 with the steering wheels in place taken along line XVI—XVI of Figure 15.
Figure 15:
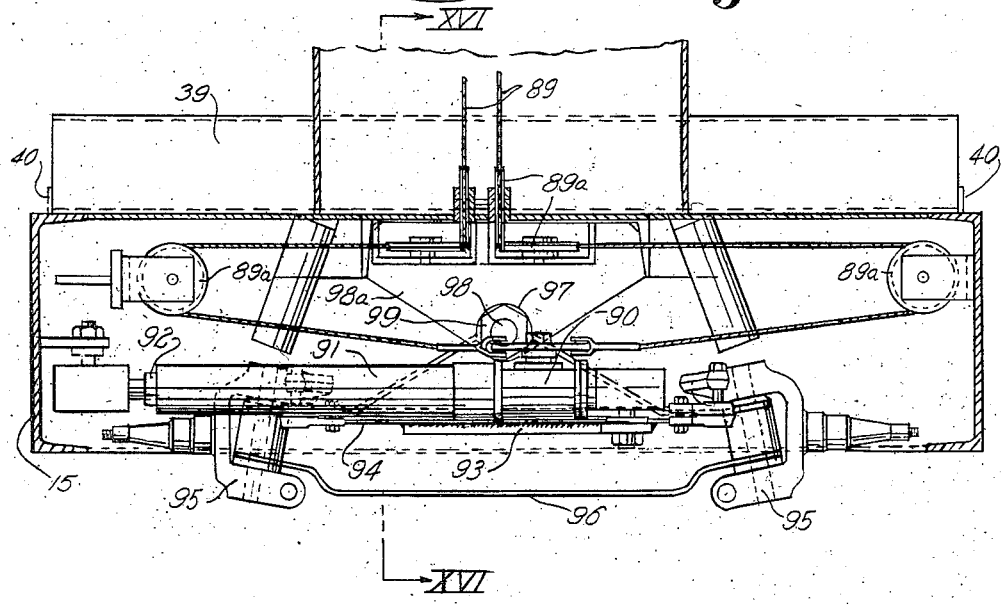
Figure 15 is a view in front elevation and in section taken generally along line XV—XV of Figure 2.

And Figure 17 is a schematic representation of an hydraulic fluid circuit system which may be used in the new machine embodiment of this invention illustrated in Figure 1.

GENERAL ASSEMBLY OF THE NEW MACHINE

Referring to the drawings, an embodiment of this invention as illustrated therein comprises a removable bin assembly 10 mounted on and affixed to a mobile truck assembly 11 and a throwing assembly 12 nested in the generally open center of truck assembly 11 beneath bin assembly 10. A prime mover 13 which may be a diesel engine is mounted above a rear platform 14 on a rigid structural frame 15 in truck assembly 11. The prime mover 13 in turn drives a pair of driving wheels 16 and a hydraulic liquid pump 17 connected in a hydraulic system. By means of that hydraulic system a pair of steering wheels 18 may be steered or the moving parts in throwing assembly 12 may be run at a selected speed to throw granular material fed into throwing assembly 12 through a discharge opening 19. Throwing assembly 12 is substantially universally mounted between pillars 20 to which it is pivotally connected by trunnion bearings 21. Pillars 20 are fixed to turntable plate 22 which may be rotated about a generally vertical post 23 fixed to truck assembly 11 in the generally open center thereof. Post 23 is not only substantially directly beneath discharge opening 19 but the axis of post 23 is also adjacent the center of gravity of throwing assembly 12 thereby reducing the horizontal diameter of the horizontal arc traversed by throwing assembly 12 in its operations. Throwing assembly 12 is also nested relatively close to the surface 24 on which the new machine runs between the sides of frame 15 in such a way as not to interfere with delivery of granular material projected through a delivery opening 25 at the front of throwing assembly 12. By virtue of the generally universally mounting of throwing assembly 12 an operator by means of a handle 26 extending outwardly towards the operator's side of the new machine, the throwing assembly can be aimed or pointed in the direction in which the granular material is to be thrown without any too burdensome force having to be exerted. Accurate control of the direction and of the trajectory and distance of throwing may be obtained by a combination of the aiming of throwing assembly 12 including its delivery opening 25 and the speed at which the rotating within assembly 12 are run by a hydraulic motor 26a. The speed of that motor is set at that predetermined rate of rotation which will give the distance and/or trajectory desired for the particular direction selected.

Truck assembly

In truck assembly 11, the frame 15 comprises a relatively smooth peripheral structural band 27 which may be made up of channels and which in the embodiment shown is semi-hexagonal at the front end 28 and at the rear end 29 thereof. A rear platform 14 covers rear end 29 on each side of the prime mover 13 which as aforesaid may be a conventional diesel engine. A platform 30 may be used to cover the front end 28 of the frame 15 leaving a generally open drop center 31 intermediate the ends 28 and 29 and the sides of frame 15. Cross longitudinal structural members 32 and 33 are also employed in frame 15 in completing its structure. The cross structural members 33 may be Z-members in order to support longitudinal structural strips 34 and channel sections 35 and 35a. Channel sections 35 and 35a are joined as shown in Figure 3 to form a rigid spider having recesses 36 cut out of the respective webs thereof. Brackets 37 are welded on the spider arms 35 and 35a adjacent the outer edges of the respective recesses 36 and support rollers 38 which rollers are properly bushed and held in rotatable relation relative to the brackets 37. These roller members 38 are spaced equidistant from each other and from the vertical center line of frame 15 in the new machine. The retainer post 23 is welded or otherwise affixed to the center of the cross channel 35 coincident with the aforesaid vertical center line. In addition, there are provided adjacent the inward edges of the platforms 14 and 30 and affixed to frame 15, transverse upstanding structural members 39 which with end plates 40 fix the position for the seating and bolting of bin assembly 10 to truck assembly 11 through appropriate registering holes in the respective assemblies.

Diesel engine 13 is supported on legs 41 fixed to members of frame 15. The engine 13 is provided with a radiator 42 and a fuel tank 43 of conventional nature. A reversing gear and clutch is contained within the housing 44 on the rearward end of engine 13. A lever 46 is directly connected by a push-pull cable and suitable conduit to a lever 47 controlling the forward, neutral and reverse operation of the engine 13, and hence the respective forward, stop and reverse action of drive wheels 16, by the mechanism in housing 44. Another lever 46a for forward, neutral and reverse action is mounted on the exterior of bin assembly 10 in the event that in the course of a throwing operation the operator wishes to move the new machine.

A shaft 48 extending outwardly at the front of engine 13 turns a gear 49 which drives an hydraulic liquid pump 17 by means of a gear chain 50. A shield or guard 51 is mounted around the forward end of engine 13 at the rear edge of truck assembly 11. A plurality of openings 52 may be provided in the rearmost panel of guard 51 to increase the circulation of air around radiator 42 and the sides of engine 13.

Engine 13 has an output shaft 53 which is keyed to a bevel gear 54. A suitable bearing and seal 55 is provided between the interior of a housing 56 and the interior of the housing 44 into which the inner end of shaft 53 extends. The lower end of housing 56 rotatably supports a meshing bevel gear 57 in bearings 58. A shaft 59 extends downwardly and rearwardly forming a reentrant angle and is connected to one side of a flexible coupling 60. The other side of the coupling 60 turns a spline shaft 61 which is keyed at its lower end to a bevel pinion 62. Bevel pinion 62 meshes with and turns a differential gear 63 rotatably mounted within a dome housing 64. Bevel gears 65 with their axes in the plane of and connected to differential ring 63 are in mesh in conventional manner with bevel gears 66 respectively keyed to spline shafts 67. These shafts are enclosed within stationary hollow sleeves 68 extending between the housing 64 and in a position just inwardly of the respective rear wheels 16. A seal 69 is provided at the outer ends of the sleeves 68. Shaft 67 extends into the interior of each wheel 16, respectively, through a seal and bushing 70 and terminates in keyed relation to a spur gear 71. Gear 71 is in driving relation engagement with an internal gear 72 bolted to a web 73 and drum 74 comprising parts of wheel 16. A resilient rubber tire assembly 76 has a tight fit relative to drum 74 to complete drive wheels 16. Dead axles 77 extend from wheel 16 and are fastened by press fits in the hollow sleeves 78. Axles 77 are fastened to the hubs of the webs 73 by combined thrust and radial bearing 79. A nut 79a suitably locked in place engages the threaded end of each axle 77 to insure maintenance of the wheel assembly. A plate 15a is welded respectively to each sleeve 68 and 78. The upper side of plate 15a is in turn bolted to the underside of longitudinal structural frame members 32. Hence, the driving wheels 16 will revolve in proportion to the speed of the prime mover 13 and in a forward or reverse direction as determined by the mechanism in housing 44, unless levers 46 and 46a are in neutral position. As will be seen from Figure 2 the width of the drive wheels 16 is greater than the width of the steering wheels 18 because of the greater weight principally due to engine 13, borne by the driving wheels. In addition, the distance between the drive wheels 16 is greater than the distance between the steering wheels 18 in order that there will be greatest stability of the new machine and in order to give ample steering room for wheels 18 within the outer periphery of frame 15.

At the forward end of the truck assembly 11 the peripheral members of frame 15 are recessed to provide steps 80 on each side thereof. At the extreme forward portion thereof there is an enclosed steering column 81 having therein a chain sprocket 82 controlling a roller chain 83 meshing therewith. A steering wheel 84 is keyed to the shaft of sprocket 82 to steer the new machine by turning wheels 18. A horn button 85 to operate a horn 86 by electrical connections thereto is also provided for the operator during the driving movement of the new machine. Similarly, a light switch 87 is affixed to column 81 and electrically connected to warning or flasher lights 88 mounted on bin assembly 10. Whenever a bin assembly 10 may be made removable relative to a truck assembly 11, plug or other connections in the electrical circuits can be disconnected so that the removal can be effected and when the bin assembly 10 is replaced, such plug connections can be reestablished to operative circuit relation. The respective ends of the roller chain 83 are connected to a flexible cable 89 which by means of suitable guide sheaves 89a operates on a pilot valve 90 controlling the flow of hydraulic fluid into a standard "Vickers" hydraulic steering booster 91. A plunger 92 in booster 91 is pivotally fixed to frame 15 and the casing of booster 91 is pivotally connected to an arm 93 affixed to a tie-rod 94. Tie-rod 94 is pivotally connected to steering knuckle assemblies 95 carrying stub axles for the steering wheels 18. Wheels 18 are rotatably connected thereto through roller bearings. The steering knuckle assemblies 95 in turn are carried in pivotal connection through king pins by the ends of a transverse bolster 96, the upper central portion of which is a longitudinal bearing 97. A hinge pin 98 extends through the bearing 97 and also through depending plates 98a on each side of the ends thereof. Plates 98a are affixed to frame 15 transversely thereof. Nuts 99 and suitable washers and bushings are provided to minimize wear between the hinge pin 98 and the bolster 96. Such a hinge connection between the steering wheels 18 of the new machine and the new machine makes it possible to keep all wheels on surface 24 and to disturb the general levelness of the machine less despite unevenness of the floors around the furnaces served by the new machine. It is possible in place of the rubber tired wheels 16 and 18 to substitute therefor flanged rims to run on rails if in a particular situation such is desirable. When flanged wheels are used in connection with the new machine of this invention in place of the rubber tired wheels shown, the steering mechanism which has been described will ordinarily not be required unless the flanged rims are made removable so that a new machine may either be utilized with tracks or as wholly mobile equipment capable of running on any vehicular surface. An operator standing on platform 30 is also provided with a brake pedal 100 which operates a master hydraulic braking system cylinder 101 of conventional make. Cylinder 101 is suitably connected to internal expanding hydraulic brakes which work against internal brake drums 102 affixed to the inside of the drive wheels 16. An accelerator foot pedal 103 is pivotally mounted on platform 30 and has a lower end 104 extending through an opening in platform 30 to operate a push-pull cable 104a directly connected to a throttle lever 105 on engine 13. A spring is provided to urge pedal 103 into its topmost position which is preset to correspond to the idling speed of engine 13. Throttle lever 105 is long enough and near enough to the operator's side of the new machine to be within convenient reach of a person manning the throwing assembly 12. After moving the new machine into position before the door of a furnace, the operator on platform 30 will generally take his foot off the pedal 103 causing the engine 13 to idle and place lever 46 in neutral position, stopping the drive wheels 16 and arresting the movement of the new machine. Whoever then mans the throwing assembly 12 will usually increase the speed of engine 13 by correspondingly moving throttle lever 105 to a preselected intermediate position to speed the engine up to a rate which will furnish sufficient power for the throwing assembly 12 at any desired speed therein selected and to move the new machine at a relatively slow pace if the lever 46a should be moved out of neutral and into forward or reverse position in the course of the throwing operation.

Lever 105 is held in that intermediate position by a dog 105a which is lifted so as to engage a notch 105b in the top of lever 105. When the throwing operation is completed and lever 46a placed in neutral and it is desired to drive the new machine away, all that is necessary for the operator on platform 30 to do is to depress accelerator pedal 103 to allow dog 105a to swing out of notch 105b and into its vertical dotted position as shown in Figure 14 under the influence of gravity thereby freeing lever 105 to swing through its full range of movement from idling to maximum speed under the influence of pedal 103. Or, lever 105 can be pulled down enough to let dog 105a return to its vertical non-engaging position as shown in dotted outline in Figure 14.

From the foregoing, it is apparent, in addition, that the truck assembly comprises a front platform for steering and control of the machine, a rear platform for the prime mover, and between these platforms a depressed open space for the throwing mechanism. Beneath these platforms are nested in compact arrangement the front and rear wheels and axles, steering mechanism, differential, hydraulic pump, oil reservoir, etc. These parts are thus assembled in and within such small dimensions as to permit narrow gauge and short wheel base necessary for short turning radius, vehicle clearance, and other considerations rendering mobility practical without sacrificing capacity, ruggedness or accessibility for operation and maintenance relative to machines of substantially greater size and different construction heretofore used in this field.

*Bin assembly*

The bin assembly 10 is generally rectangular in plan. It includes a bin 106 having downwardly and inwardly sloping sides 107 in the central lowermost portion of which there is the discharge opening 19. Handling lugs 108, or crane handling rings or trunnions, may be provided for bin assembly 10 if it is to be removable relative to truck assembly 11. A bracket 109 is affixed to the underside of bin 106 and carries an auxiliary forward-neutral-and-reverse lever 46a connected to lever 47 by a push-pull cable 47a. A screen 110 may be placed across the open top of bin 106 so that when charged with granular material any oversized lumps can be kept out of the bin and will not pass into throwing assembly 12. Legs 111 extend downwardly from the corners of bin 106 and are welded or otherwise affixed thereto. Each of the legs 111 carries a light 88 as aforesaid and one of them will carry the horn 86 plus suitable electrical connections thereto. Legs 111 as shown in Figure 2 are substantially in the shape of an angle in section, the lower end of which is positioned by and fits next to the respective corners formed by the respective structural members 39—40 affixed to frame 15. The lower ends of the leg 111 are drilled and provided with holes registering with similar holes in the members 39—40 so that bin assembly 10 can be bolted to truck assembly 11 for rigid connection. Legs 111 are provided with short longitudinal flanges 112 and short transverse flanges 113 which however do not extend downwardly so far as to interfere with upstanding portions of the structural members 39—40. The transverse flanges 113 on the furnace side of the new machine may have bolted thereto heat guards 114 to shield an operator at handle 26, for example, from the radiation which occurs when a furnace door is open. These heat guards 114 are sheets of metal and the inner ends thereof substantially define limits of the horizontal transverse of throwing assembly 12. The forward side of the forward leg 111 on the operator's side of the new machine has affixed thereto the rungs of a ladder 115 whereby an operator from time to time can ascertain the amount of granular material in bin 106 as well as the fact of any difficulty which may occur therein. A battery is provided in a case 117 to provide at least stand-by energy for the lights 88 and horn 86 as well as starting power for engine 13 through a conventional starting motor (not illustrated).

A bail gate 118 is hinged to the opposite sides of the neck 119 defining discharge opening 19 so as to swing beneath and away from the lower end of opening 19 under the influence of a link 120 pivoted thereto and operated by a handle 121 pivoted in turn to a sector plate 122 fastened to the underside of bin 106. A spring catch may be used to lock handle 121 and thereby gate 118 in any position desired for a particular area of opening or for the complete closing of discharge opening 19.

Lugs 123 are welded to legs 111 on the furnace side of the machine and are drilled to provide journaling support for a shaft 124 of a spoon support on each of such legs. Shaft 124 in turn axially supports a plate 125 welded to the shaft. A concave roller 126 is mounted on a rod 127 and turns freely relative thereto. The outer ends of rod 127 are welded to plate 125, the portion of roller 126 toward said plate 125 fitting into a recess cut therein. These rollers 126 at the respective ends of the machine on the furnace side are used to support deflecting spoons used when the granular material thrown by assembly 12 is to be placed on the inside of the front of the furnace or at some other part difficult to reach by direct throwing. When not in use the spoon supports can be swung from operative position as shown in Figure 2 inwardly inside of the furnace side of truck assembly 11. Further keying means may be provided to hold the spoon supports in whatever intermediate or fully extended position is desirable.

*Throwing assembly*

In the throwing assembly 12, there is the turntable plate 22 which is circular in plan and has cutout portions 128 therein to lessen its weight and provide openings through which any debris may fall to the surface 24. The rearward opening 128 is also wide enough to accommodate the vertical traverse, usually about 20°, of assembly 12 as shown by the dot-and-dash outline marked A—B of housing 133 in its elevated position. A further opening 129 is provided for the outer end of a lubrication fitting 130 fastened to the underside of turntable 22 and extending into the interior of a cap 131.

Cap 131 is welded to the underside of turntable 22 in the center thereof and fits over post 23 in an easy-fitting relation which does not interfere with the horizontal rotation of throwing assembly 12 and which at the same time centers throwing assembly 12 relative to the bin assembly 10 and truck assembly 11. While post 23 and cap 131 might have their relative positions reversed, the mode shown is preferable in order to keep cap 131 free of any accumulation of debris.

The post 23 as aforesaid, is welded to a transverse channel 35 extending between structural strips or plates 34 which are an integral portion of frame 15 the remaining channel members 35a forming the remainder of the spider have their outer ends secured to the lower flange of the structural Z-members 33 and their inner ends welded to the sides of a transverse channel 35. Hence, the lower annular surface of turntable 22 inwardly from the periphery thereof is unbroken and stably supported on the rollers 38 at angular intervals of about 120°. Because of the relation of post 23 to cap 131, the only movement which can take place between plate 22 and rollers 38 is one of rotation.

A pair of structural pillars 20 is bolted adjacent the vertical axis of turntable 22 to said turntable on each side of the center thereof in spaced relation. A housing 133 is supportably connected to the tops of pillars 20 by trunnion bearings 21 in such manner as to provide suitable clearance between housing 133 and turntable 22. Housing 133 is in two parts so that one side 134 thereof may serve as a cover by being bolted to lugs 135 welded to the other part of housing 133.

In general when the two parts of housing 133 are assembled, the device is enclosed substantially wholly on the rear except for an inspection opening 136 for which a removable cover plate 137 is provided, a feed opening 138 on the top thereof, an inspection opening 139 on the upper front portion thereof and a delivery opening 140 on the front thereof. The underside of housing 133 is also generally open as shown in Figures 4 and 5. The parallel side wall members of housing 133 include cover 134 and are supportably engaged by and normal to, the axis of trunnion bearings 21. Since the housing 133 and the equipment therein has its center of gravity generally adjacent the horizontal axis of the trunnion bearing 21, that part of throwing assembly 12 pivotally suspended from and supported by the pillars 20 is, as a consequence, in general balance. Hence, an operator on the operator's side of the new machine handling and aiming throwing assembly 12 through the medium of handle 26 is able to do his work with a maximum of ease and accuracy. Handle 26 as shown in Figures 3 and 4 is welded to the rear of housing 133 and extends rearwardly a sufficient distance for operation by an operator without offering any hazard when the new machine of this invention is moving between its throwing stations. While so moving, the throwing assembly 12 can be swung to one side so that the outer end of handle 26 is substantially inside frame 15.

Surrounding the feed opening 138 there is a funnel 141 the sides of which slope inwardly to define by means of their lower edges the minimum area of the said opening. The edges of the sides of the funnel 141 are welded to so as to be generally continuous with the adjacent edges of the non-removable part of housing 133. The bottom edges of funnel 141 are arcuate to conform closely to the periphery of a circular throwing wheel 142. A slide 143 is adjustably connected to the outside of the front side of funnel 141 whereby the length of that front side can be changed.

Delivery opening 140 is provided with a hood-like baffle 144 which extends inwardly to a position adjacent the periphery of throwing wheel 142. Granular material is thrown by wheel 142 and associated members out through opening 140 generally parallel to and beneath the top of baffle 144. If the stream of thrown granular material should tend to spread unduly, baffle 144 will assist in concentrating the stream to maintain the accuracy of throwing assembly 12.

Throwing wheel 142 comprises a hollow hub 145 which turns about a fixed shaft 126. Roller thrust bearings 147 are interposed between hub 145 and shaft 146 to permit relative rotation but prevent axial movement therebetween. A plate 148 may be used to seal the end of the hollow hub 145. Wheel 142 is provided with a circumferential groove 149 intermediate the sides thereof. The outer periphery flanges 150 of the groove define a circular right cylinder which constitutes the peripheral surface 151 of wheel 142. Transverse ribs 152 are provided at the bottom of groove 149 at spaced intervals around the groove itself. As shown in Figure 5, the lower edges of funnel 141 defining the narrowest portion of feed opening 138 are close to and guide granular material into groove 149. Similarly, the slide 143 projects into groove 149 but clears the outer edges of ribs 152. Hence, granular material discharged through discharge opening 19 of bin 106 passes directly into groove 149 of throwing wheel 142 through funnel 141 and is taken from thence and thrown out through delivery opening 140 substantially tangentially to wheel 142 into the furnace to the spot where the granular material is to be deposited.

An integral extension 153 of shaft 146 is held in a structural sleeve 154 by a set screw 155. Sleeve 154 in turn is structurally a part of housing 133 and affixed thereto by welding or otherwise. Structural strength required for the job of holding cantilever shaft 146 is insured by the provision of strengthening ribs 156 welded both to sleeve 154 and to housing 133. Around a rear and lower portion of throwing wheel 142 within housing 133 there are provided a driving pulley 157, a take-up pulley 158 and a delivery pulley 159. Preferably, these pulleys are crowned and aligned so that the median plane of each normal to the axis thereof as well as to the median plane of wheel 142 normal to the axis thereof, coincide. Further, the axes of pulleys 157—159, inclusive, are parallel to each other and to the axis of wheel 142. The three pulleys generally define an angle into which a rearward and lower portion of wheel 142 extends so that a flexible belt 160 which may be made of rubberized canvas when passed around pulleys 157, 158 and 159 will bear against a rear and lower portion of wheel 142, as shown in Fig. 4. In its engagement with wheel 142, the edges of belt 160 are in contact with surface 151 on flanges 150 thereby closing groove 149 for that part of the periphery of wheel 142 with which belt 160 is in contact. Moreover, the rearward lower edges of funnel 141 approach belt 160 to substantially enclose that portion of the groove 149 in contact with any granular material. The material in turn is thrown generally tangentially so as to pass between the top of hood 144, and the upper portion of belt 160 between vertical planes through the axes of wheel 142 and pulley 159. Such granular material issues from delivery opening 140 in a stream the force of which is determined by the speed at which wheel 142 and belt 160 move.

Delivery pulley 159 is journaled on a fixed shaft 161 having an integral extension 162 which fits in a structural sleeve 163 and is held therein by a set screw 164. Sleeve 163 is welded to housing 133 and the strength thereof in maintaining shaft 161 as a cantilever shaft is insured by strengthening ribs 156 as in the case of the mounting of wheel 142. An opening 165 is provided for a lubricant fitting affording access through suitable passages to the interior of the hollow hub of pulley 159. Similar provision is made for the hollow hubs of the other pulleys and of wheel 142 to maintain the lubrication thereof.

As shown in Figures 7 and 8, the take-up pulley 158 also rotates about a stationary shaft 166 which however is adjustable. The function of pulley 158 is to keep belt 160 tight in addition to its guidance of belt 160. This is achieved by mounting shaft 166 eccentrically relative to the axis of its integral extension or base 167. Base 167 is rotatably mounted about its central axis in a structural sleeve 168. The relative position annularly speaking between base 167 and sleeve 168 is obtained by means of stud bolts 169 and nuts 170 which can be loosened to permit rotation of base 167 relative to box 168 and then re-tightened. Each such adjustment moves shaft 166 eccentrically and hence moves pulley 158. Such an adjusting movement generally will be in a belt tightening direction to tighten belt 160. Bolts 169 extend through openings 171 in a flange plate 172 fastened only to base 167. An integral flange 167a is provided to hold base 167 in its adjusted position, when nuts 170 are tightened, by clamping sleeve 168 between flange 167a and the periphery of plate 172. A squared end 174 on base 167 projects through an opening 175 in plate 172 so that it may be engaged by a suitable wrench in making whatever eccentric tightening or loosening adjustment is required of shaft 166. Sleeve 168 like sleeves 154 and 163 is an integral part of the housing structure 133.

Pulley 158 is rotatably connected to shaft 166 by radial thrust bearings 176 and is also provided with a lubricant passage 177 of the character described earlier. A cover plate 178 closes the hollow end of the hub or pulley 158.

Drive pulley 157 has a hollow hub 179 which rotates about a hollow shaft 180 which it rotatably engages through radial thrust bearings 181. Hollow shaft 180 has an integral hollow extension 182 and flange 182a which is bolted to housing 133. A structural sleeve 173 fits over extension 182 and is a part of the structure including sleeves 154, 163 and 168.

A drive shaft 183 is welded to a drive plate 184 which in turn is rigidly bolted to hub 179. The inner ends of shaft 183 are splined and engaged by a mating coupling 185 which is keyed to the output shaft 186 of a hydraulic motor 26a bolted to the outside of flange 182a. Motor 26a may be a conventional "Vickers" hydraulic motor. The speed at which motor 26a is operated determines the rotational speed of shaft 183 and hence the speeds of belt 160 and of wheel 142 in the throwing of granular material thereby. An opening 188 for a lubrication fitting may be provided in drive plate 184 to afford access for lubricant to the sealed interior of hub 179.

It will be seen that throwing assembly 12 in respect of the parts thereof suspended by the trunnion bearings 21 is a compact and unitary device. The generally universal mounting of housing 133 and its enclosed parts of assembly 12 adjacent the horizontal and vertical axes passing through the center of gravity thereof, respectively, enables an operator manning handle 26 to point or aim delivery opening 140 easily and accurately in any direction desired for correlation with the speed selected for the throwing wheel 142 and belt 160. Thereby, the precision projection in direction, speed and trajectory of the granular material fed from bin 106 into assembly 12 is obtained. Moreover, the entire housing 133 and associated enclosed parts move bodily with the result that there is no problem in keeping belt 160 running true over pulleys 157 to 159, inclusive, and in relation to throwing wheel 142. Moreover, the tightening of belt 160 becomes an extremely simple matter, without presenting any problem about maintaining parallelism between the respective shafts of the respective pulleys and throwing wheel. Further, the drilling of the sleeves holding the respective shafts can be done with precision, the sleeves being fixed relative to each other at the time of such drilling.

It is also possible to utilize the novel throwing assembly portion of this invention in conjunction with equipment such, for example, as a bin assembly to be wholly moved about by a crane. In this last-mentioned situation, neither the drive nor steering wheels of truck assembly 11 would be required nor the parts disclosed herein relating solely to making such wheels operate.

*Hydraulic system*

A hydraulic system which may be used in the new machine of this invention is schematically shown in Figure 17. In such a system a tank 190 is provided and fastened to frame 15 of truck assembly 11. A filler cap 191 is provided in the filler opening of tank 190 and is of a conventional type which filters the hydraulic liquid, such as oil, poured into tank 190 and also keeps any dust in the air out of the tank while at the same time venting it to atmosphere. A suction pipe 192 extends into the body of hydraulic fluid in tank 190 and is connected to an oil filter 193 therein to filter hydraulic liquid passing into pipe 192. Pipe 192 extends to pump 17 from whence the hydraulic fluid now at increased pressure passes into a discharge pipe 194 which in turn is connected to a conventional combination flow control and relief valve assembly 195. A setting knob 196 controls the rate of flow of hydraulic liquid through valve assembly 195 into a pressure pipe 197, it being possible to regulate such control from zero to the maximum possible for the equipment. Hence, during a throwing operation, knob 196 might be set by the person manning handle 26 at any speed desired for and suitable to motor 26a, a prime mover 13 furnishing constant power if dog 105a is engaging notch 105b of lever 105. Whenever a throwing operation is concluded and it is desired to drive the new machine elsewhere, knob 196 can be moved to a position provided a rate of flow suitable for steering cylinder 91 under the control of an operator at the driving station on platform 30.

Valve assembly 195 also incorporates a relief valve therein and whatever hydraulic fluid is by-passed by the relief valve or by-passed as a result of the selected setting of knob 196 returns to the interior of tank 190 by way of a return pipe 198. Whenever hydraulic liquid is conducted through valve assembly 195, from discharge pipe 194, enters a pressure pipe 197 and passes into a conventional four-way valve 199 controlled by a lever 200. Lever 200 has three settings, in one of which hydraulic fluid from pipe 197 is returned by a return pipe 201 to an exhaust pipe 202 whence it re-enters the body of hydraulic liquid in tank 190. In another setting of lever 200 the hydraulic fluid from pipe 197 passes into an inlet pipe 203 connected to the input end of steering cylinder 91. An exhaust pipe 204 connected to the output port of steering cylinder 91 returns any hydraulic fluid flowing therethrough directly to tank 190. In the remaining setting of lever 200 hydraulic fluid from pipe 197 passes through valve 199 and enters a pipe 205 connected to the input side of hydraulic motor 26a. Hydraulic fluid issuing from motor 26a is returned through a pipe 206 to return pipe 202 by way of a T 207. Suitable portions at least of the aforesaid hydraulic system pipes are flexible wherever connected to relatively movable solid parts of the equipment as in the case of pipes 205 and 206. By the use of such a hydraulic system, further, in the new machine of this invention the prime mover 13 and pump 17 can remain running with the setting of valve assembly 195 at zero when neither any steering nor any throwing operation is to be conducted. The various settings of knob 196 will produce very accurate speeds of motor 26a and thereby great accuracy in the throwing operation by throwing assembly 12.

Various modifications may be made in various aspects and uses of this invention without departing from the spirit thereof or the scope of the appended claims.

What is claimed is:

1. In combination, in a granular material throwing machine assembly, a truck having a generally open center between the sides and ends thereof for a movable throwing assembly, a vertical post rigidly mounted in said center horizontally projecting, roller members supportably connected to said truck in said center in generally equidistant spaced relation about said post, a turntable plate movably supported on its underside by and bearing against said roller members, a connector rigidly connected to said plate and fitting around said post, pillars connected to the upper side of said plate and spaced to each side adjacent the center thereof, and a throwing assembly swingably mounted by a horizontal axis between said pillars, the center of gravity of said throwing assembly generally being adjacent the axis of said swingable mounting, whereby said throwing assembly is universally mounted.

2. In combination, in a granular material throwing machine assembly, a throwing assembly, a housing having spaced sidewall members in said throwing assembly, said housing having a feed opening adjacent the top thereof and a delivery opening adjacent the front thereof, a horizontal axis throwing wheel mounted in said housing generally below said feed opening and in back of said delivery opening, means in said throwing assembly for driving said throwing wheel, a plurality of pulleys mounted in said housing having their axes parallel to the axis of said throwing wheel, the axes of said pulleys defining a dihedral angle extending generally downwardly in back of said throwing wheel and across the bottom thereof, a flexible belt passing around said pulleys and a portion of the rear and bottom periphery of said throwing wheel, means supporting said throwing assembly for rotation about a vertical axis substantially intersecting the axis of said throwing wheel, and means spaced from and adjacent the level of the axis of said throwing wheel for pivotally suspending opposite sides of said throwing assembly about a horizontal axis adjacent its center of gravity and in substantially symmetrical balance relative to a median plane between said opposite sides perpendicular to said last-mentioned axis, said last-mentioned means normally being positioned below the rearward portion of said feed opening.

3. In combination, in a granular material throwing machine assembly, a throwing assembly, a housing having spaced sidewall members in said throwing assembly, said housing having a feed opening at the top thereof and a delivery opening at the front thereof, a horizontal axis throwing wheel mounted in said housing in generally radial relation to said feed opening and tangential rotation to said delivery opening, means in said throwing assembly for driving said throwing wheel, at least three pulleys mounted in said housing having their axes parallel to the axis of said throwing wheel, the axes of said pulleys defining a dihedral angle extending generally downwardly in back of said throwing wheel and across the bottom thereof, a flexible belt passing around said pulleys and a portion of the rear and bottom periphery of said throwing wheel, a shaft supporting the upper one of said pulleys extending toward the inside of one side of said throwing assembly, a fluid motor attached to the outside of said one side in axial registry with said shaft, splined means rotatably connecting said upper pulley to said shaft to move said belt, a further shaft supporting the intermediate one of said pulleys, means for moving said further shaft eccentrically to shift said last-mentioned pulley to keep said belt tight, and means spaced from the axis of said throwing wheel for pivotally suspending opposite sides of said throwing assembly about a horizontal axis and in substantially symmetrical balance relative to a median plane between said opposite sides perpendicular to said last-mentioned axis.

4. In combination, in a granular material throwing machine assembly, a throwing assembly, a housing having spaced side wall members on opposite sides of said throwing assembly, one of said side wall members being removable, said housing having a feed opening adjacent the top thereof and a delivery opening generally in the front thereof, a horizontal axis throwing wheel mounted in said housing generally below said feed opening and in tangential relation to said delivery opening, means in said throwing assembly for driving said throwing wheel, at least three pulleys mounted in said housing having their axes parallel to the axis of said throwing wheel, mounting means for said pulleys supported by the side of said housing opposite to the side having said removable side wall member, the axes of said pulleys defining a dihedral angle extending generally downwardly in back of said throwing wheel and across the bottom thereof, a flexible belt passing around said pulleys and a rear and bottom portion of said throwing wheel, and means spaced from the axis of said throwing wheel for pivotally suspending said opposite side wall members, said throwing assembly about a horizontal axis adjacent the level of the axis of said throwing wheel and in substantially symmetrical balance relative to a median plane between the opposite sides of said throwing assembly perpendicular to said last-mentioned axis, said last-mentioned means normally being positioned below and toward an after portion of said feed opening.

5. In combination, in a granular material throwing machine assembly, a throwing assembly, a housing having spaced side walls in said throwing assembly, one of said side walls being removable, said housing having a feed opening at the top thereof and a delivery opening at the front thereof, a horizontal axis throwing wheel mounted in said housing in generally radial relation to said feed opening and tangential relation to said delivery opening, at least three pulleys mounted in said housing having their axes parallel to the axis of said throwing wheel, the axes of said pulleys defining a dihedral angle extending generally downwardly in back of said throwing wheel and across the bottom thereof, said throwing wheel and pulleys having bearings supported by the side of said housing opposite to the side having said removable side wall, a flexible belt passing around said pulleys and a portion of the rear and bottom periphery of said throwing wheel, spaced pillars on opposite sides of said throwing assembly adjacent and outside its side walls, trunnion bearings respectively pivotally connecting said side walls of said throwing assembly to said pillars about a horizontal axis adjacent the center of gravity of said side walls of said throwing assembly, a turntable plate connected to said pillars adjacent the center of said plate, and horizontally projecting roller means bearing against and rotatably supporting the underside of said plate about a vertical axis passing adjacent the center of gravity of said throwing assembly.

6. In combination, in a granular material throwing machine assembly, a throwing assembly pivotally mounted about a horizontal axis adjacent its center of gravity, a housing having spaced side wall members in said throwing assembly, said housing having a feed opening and delivery opening therein, said feed opening being above said first-named horizontal axis in all positions of said throwing assembly, a throwing wheel mounted on a horizontal axis in said housing and positioned adjacent said openings, said respective horizontal axes being proximately spaced relative to each other, a plurality of pulleys mounted in said housing adjacent the rear and bottom portion of the periphery of said throwing wheel, a flexible belt passing around said pulleys and pressing against the adjacent rear and bottom portion of the periphery of said throwing wheel, one of said pulleys being a driving pulley for said belt and wheel, a hydraulic motor affixed to said housing adjacent said pulley, connecting means between said hydraulic motor and driving pulley, said throwing assembly having said hydraulic motor positioned such that the sides of said throwing assembly are in substantially symmetrical balance, means for supporting said throwing assembly for rotation about a vertical axis passing through said feed opening, and means for operating said hydraulic motor at a selected speed.

7. In combination, in a mobile granular material throwing machine assembly, a self-propelled steerable truck having wheels and a generally open drop center between the sides and ends thereof adjacent the level of the axes of said wheels, a vertical post rigidly and substantially centrally mounted in said center, horizontally projecting roller members supportably connected to said truck in said center in generally equidistant spaced relation about said post, a turntable plate movably supported on its underside by said roller members, a cap rigidly connected to said plate and fitting over said post, pillars connected to the upper side of said plate and spaced to each side of the center thereof, a throwing assembly swingably mounted by a horizontal axis between said pillars with the center of gravity of said throwing assembly generally being adjacent said axis of said swingable mounting, a feed opening in said throwing assembly positioned above said post and having a substantial portion forward of said horizontal axis, said throwing assembly having a throwing wheel with a horizontal axis positioned in spaced but proximate relation to said first-named horizontal axis, and a bin on said truck with a fixed discharge for granular material positioned above said feed opening in all positions of said throwing assembly.

8. In combination, in a mobile granular material throwing machine assembly, a self-propelled truck having a structural frame, said frame being generally open and unobstructed in the center for a movable throwing assembly and having platforms at the ends thereof, a transversely extending bolster pivotally connected to said frame adjacent the front thereof about a longitudinal horizontal axis, steering wheels pivotally mounted on the ends of said bolster inside of said frame, hydraulic means for turning said steering wheels to steer said truck, a prime mover connected to the rear end of said frame, driving wheels being rotatably mounted in said frame, sides of said frame adjacent said prime mover, said driving wheels being rotatably mounted in said frame, mechanism adjacent to said prime mover connecting said driving wheels operatively to said prime mover, a hydraulic pump operatively connected to said prime mover, a hydraulic motor attached to said throwing assembly to drive it, said throwing assembly having a centrally positioned feed opening in the top thereof, positioning members rigidly connected to said frame, an elevated bin spanning said center to discharge materiel into said feed opening and having legs conforming to fit next to said positioning members, and means for rigidly connecting said bin to said positioning members.

9. In combination, in a mobile granular material handling machine assembly, a self-propell truck having an operator's station on one end thereof, a prime mover mounted on said truck at one end thereof, controls at said station to regulate the speed of said prime mover and the direction of movement of said truck, a throwing assembly mounted on said truck intermediate the ends and sides thereof and in a generally universal manner adjacent the center of gravity of said throwing assembly to discharge material from one side of said truck, auxiliary controls positioned adjacent the other side of said truck to regulate the speed of said prime mover and the direction of movement of said truck, said last-mentioned controls being within reach of a person operating said throwing assembly from said other side of said truck, hydraulic means attached to said throwing assembly to move the parts thereof at a preselected speed, said throwing assembly having said hydraulic means positioned such that the sides of said throwing assembly are in substantially symmetrical balance, and valve means adjacent said other side of said truck for changing the speed of said hydraulic means to change the speed of said throwing means.

(References on following page)

References Cited in the file of this patent

UNITED STATES PATENTS

| | | |
|---|---|---|
| 802,230 | Moss | Oct. 17, 1905 |
| 1,533,847 | Freedenburg | Apr. 14, 1925 |
| 1,576,366 | Schieldrop | Mar. 9, 1926 |
| 1,750,864 | Schieldrop | Mar. 11, 1930 |
| 1,795,908 | Thompson | Mar. 10, 1931 |
| 2,029,832 | Pierson | Feb. 4, 1936 |
| 2,568,536 | Beech | Sept. 18, 1951 |

FOREIGN PATENTS

| | | |
|---|---|---|
| 583,904 | France | Nov. 10, 1924 |
| 654,902 | Germany | Jan. 4, 1938 |

UNITED STATES PATENT OFFICE
CERTIFICATE OF CORRECTION

Patent No. 2,856,084                            October 14, 1958

Edward W. Pottmeyer

It is hereby certified that error appears in the printed specification of the above numbered patent requiring correction and that the said Letters Patent should read as corrected below.

Column 5, line 49, and column 10, line 42, for "Vickers", in each occurrence, read -- "VICKERS" --; column 11, line 58, for "T" read -- tee --; column 12, line 3, after "center" insert a comma; same line 3, after "projecting" strike out the comma; line 31, after "wheel" strike out the comma; column 13, line 46, strike out "of said side walls"; column 14, line 37, after "end of said frame," insert -- driving wheels respectively positioned inwardly of the sides of said frame adjacent said prime mover, said --; lines 39 and 40, strike out "sides of said frame adjacent said prime mover, said driving wheels being rotatably mounted in said frame,"; line 53, for "self-propell" read -- self-propelled --.

Signed and sealed this 19th day of May 1959.

(SEAL)
Attest:
KARL H. AXLINE
Attesting Officer

ROBERT C. WATSON
Commissioner of Patents